(12) United States Patent  
Kitamura

(10) Patent No.: US 7,434,680 B2  
(45) Date of Patent: Oct. 14, 2008

(54) BELT UNIT AND IMAGE FORMING APPARATUS

(75) Inventor: Makoto Kitamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 93 days.

(21) Appl. No.: 11/019,025

(22) Filed: Dec. 21, 2004

(65) Prior Publication Data

US 2005/0139456 A1    Jun. 30, 2005

(30) Foreign Application Priority Data

Dec. 26, 2003    (JP)    ............................. 2003-433757

(51) Int. Cl.
*B65G 39/16*    (2006.01)
(52) U.S. Cl. ...................... 198/806; 198/807
(58) Field of Classification Search ............... 198/806, 198/808, 861.2, 805, 807, 810.03
See application file for complete search history.

(56) References Cited

U.S. PATENT DOCUMENTS

| | | | | | |
|---|---|---|---|---|---|
| 2,655,252 | A | * | 10/1953 | Spurgeon ................... | 198/806 |
| 3,540,571 | A | * | 11/1970 | Marsh et al. ............... | 198/806 |
| 4,174,171 | A | * | 11/1979 | Hamaker et al. ........... | 399/165 |
| 4,842,130 | A | * | 6/1989 | Mraz ........................ | 198/839 |
| 4,996,563 | A | * | 2/1991 | Blanding ................... | 399/165 |
| 5,365,321 | A | * | 11/1994 | Koshimizu et al. ......... | 399/329 |
| 5,471,289 | A | * | 11/1995 | Satoh et al. ................ | 399/328 |
| 5,507,382 | A | * | 4/1996 | Hartwell et al. ............. | 198/837 |
| 5,717,984 | A | * | 2/1998 | Wong ....................... | 399/165 |
| 5,896,979 | A | * | 4/1999 | Hokari et al. .............. | 198/807 |
| 5,991,575 | A |   | 11/1999 | Okiyama et al. | |
| 6,125,994 | A | * | 10/2000 | Todome ..................... | 198/806 |
| 6,181,900 | B1 | * | 1/2001 | Lee et al. .................... | 399/165 |
| 6,220,427 | B1 | * | 4/2001 | Ratz et al. ................. | 198/861.2 |
| 6,267,228 | B1 | * | 7/2001 | Cadwell et al. ............. | 198/806 |
| 6,336,550 | B1 | * | 1/2002 | Muntener ................... | 198/806 |
| 6,776,280 | B2 | * | 8/2004 | Hovstø et al. ............... | 198/806 |

FOREIGN PATENT DOCUMENTS

| | | |
|---|---|---|
| JP | 6-64773 A | 3/1994 |
| JP | 11-201244 A | 7/1999 |
| JP | 2000-264479 A | 9/2000 |
| JP | 2002-060039 A | 2/2002 |
| JP | 2002-332111 A | 11/2002 |

\* cited by examiner

*Primary Examiner*—James R Bidwell
(74) *Attorney, Agent, or Firm*—Panitch Schwarz Belisario & Nadel LLP

(57) ABSTRACT

A belt unit (10) includes a drive roller (5), an idle roller (6) and an endless belt (4) stretched around the drive roller (5) and the idle roller (6). The drive roller (5) is supported by a belt frame (8) via bearings (2). The idle roller (6) is supported by the idle roller frame (16) via bearing members (10L, 10R). The idle roller frame (16) is rotatable relative to the belt frame (8) about a rotation axis aligned with the center position of the belt frame (8), with the result that the influence of the deformation of the belt frame (8) is not exerted on the idle roller frame (16).

11 Claims, 17 Drawing Sheets

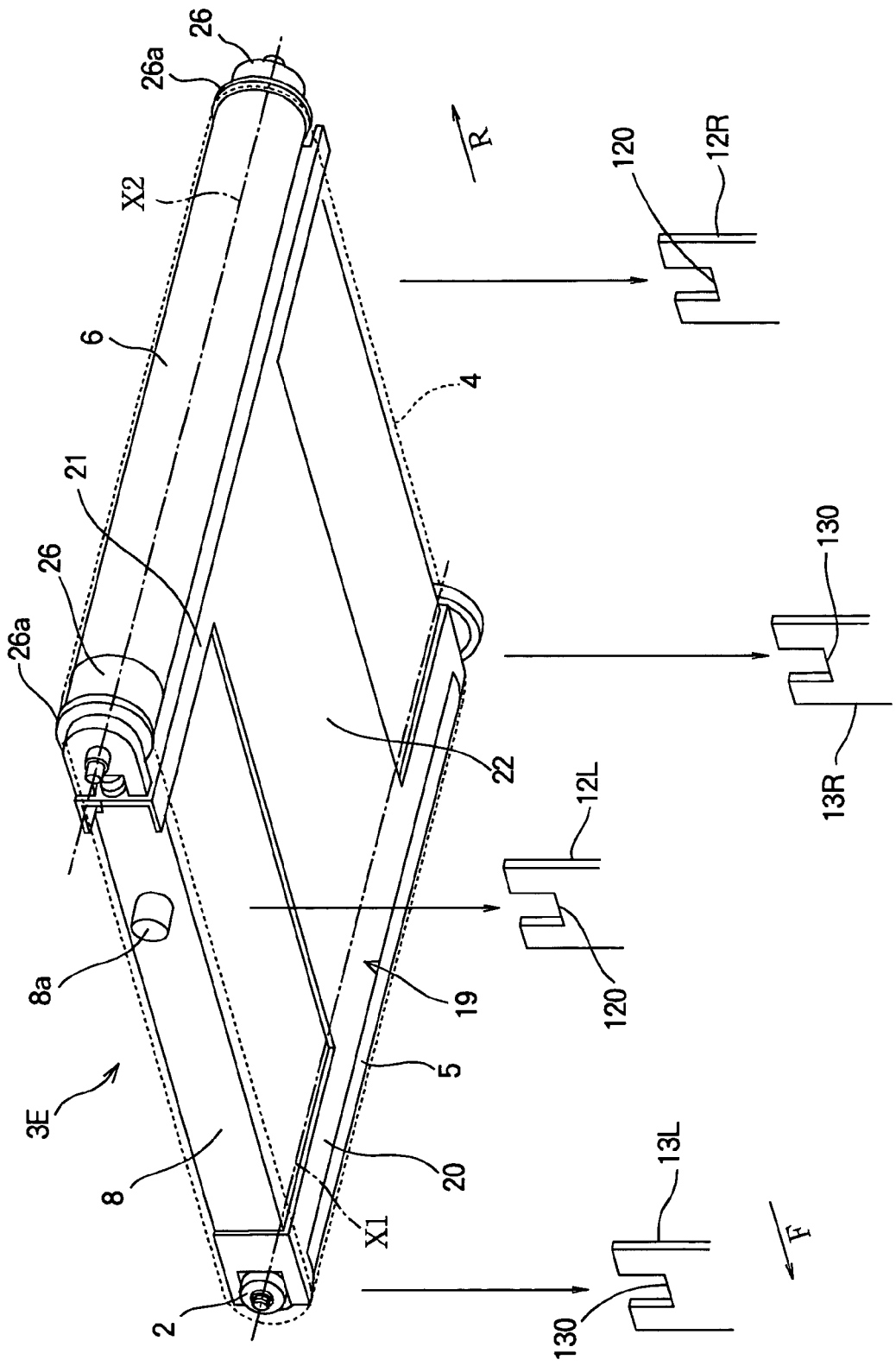

BELT UNIT AND IMAGE FORMING APPARATUS

BACKGROUND OF THE INVENTION

This invention relates to a belt unit having an endless belt stretched around a plurality of rollers, and an image forming apparatus using the belt unit.

Conventionally, there is a type of image forming apparatus that uses an endless belt as a conveyor belt that conveys a recording medium, a transfer belt that bears a toner image, or the like. Such an image forming apparatus is disclosed in, for example, Japanese Laid-Open Patent Publication No. 2002-60039 (particularly, in pages 4 to 5 and FIGS. 5 to 6).

FIG. 17 shows an example of a conventional belt unit used in an image forming apparatus. The belt unit includes a drive roller 205 having a surface layer made of a high friction material, an idle roller 206 provided substantially in parallel to the drive roller 205, and an endless belt 204 stretched around the drive roller 205 and the idle roller 206. The drive roller 205 is rotatably supported by a belt frame 208 via bearings 202. The idle roller 206 is rotatably supported by the belt frame 208 via bearing members 210L and 210R.

Positioning members 212a and 212b and positioning members 213a and 213b are provided in the image forming apparatus. The positioning members 212a and 212b engage shaft portions 206L and 206R of the idle roller 206 to position the idle roller 206 in the vertical direction. The positioning members 213a and 213b engage bearings 202 (one of which is shown in FIG. 17) of the drive roller 205 to position the drive roller 205 in the front-rear direction.

As schematically shown in FIGS. 18A and 18B, if the parallelism between the drive roller 205 and the idle roller 206 is low, it is known that the endless belt 204 (proceeding in the direction indicated by P) skews as indicated by an arrow +S (FIG. 18A) or an arrow −S (FIG. 18b) according to the inclination of the idle roller 206 with respect to the drive roller 205. As shown in FIG. 19, in order to prevent skewing of the endless belt 204, a pulley 209 is fixed to an end of the idle roller 206 in the axial direction. A bead 215 is bonded to an inner surface of the endless belt 204, and engages the groove of the pulley 209.

However, if the positioning accuracies of the positioning members 212a, 212b, 213a and 213b (FIG. 17) are low, or if the image forming apparatus is distorted because of lack of rigidity, the belt frame 208 may deform, and therefore the parallelism between the drive roller 205 and the idle roller 206 may be reduced. In such a case, due to the skewing of the endless belt 205, the bead 215 is strongly pressed against the groove of the pulley 209, and therefore a large shear stress may be applied to the bonding portion of the bead 215 and the endless belt 204. Accordingly, the bead 215 may be peeled away from the endless belt 204.

SUMMARY OF THE INVENTION

An object of the present invention is to provide a belt unit and an image forming apparatus capable of maintaining the parallelism of rollers around which an endless belt is stretched, and capable of preventing the endless belt from skewing.

According to the invention, there is provided a belt unit attachable to and detachable from a main body. The belt unit includes a first roller rotated by a driving force of a driving source, a second roller having an axis substantially in parallel to an axis of the first roller, an endless belt stretched around the first and second rollers, a first supporting member that supports the first roller, a second supporting member that supports the second roller, a positioning member provided on the first supporting member for positioning the belt unit with respect to the main body, and a rotational supporting mechanism that supports the second supporting member with respect to the first supporting member in such a manner that the second supporting member is rotatable relative to the first supporting member.

With such an arrangement, because of the provision of the rotational supporting mechanism, it becomes possible to prevent the second roller from being inclined with respect to the first roller and to maintain the parallelism between the first and second rollers, even when the deformation of the first supporting member occurs. Therefore, it becomes possible to prevent skewing of the endless belt without causing a problem such as a peeling of a bead or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 14 is a perspective view of a belt unit according to the sixth embodiment of the present invention;

DETAILED DESCRIPTION OF THE PREFERRED EMBODIMENT

Embodiments of the present invention will be described with reference to the attached drawings.

First Embodiment

Figure 1:
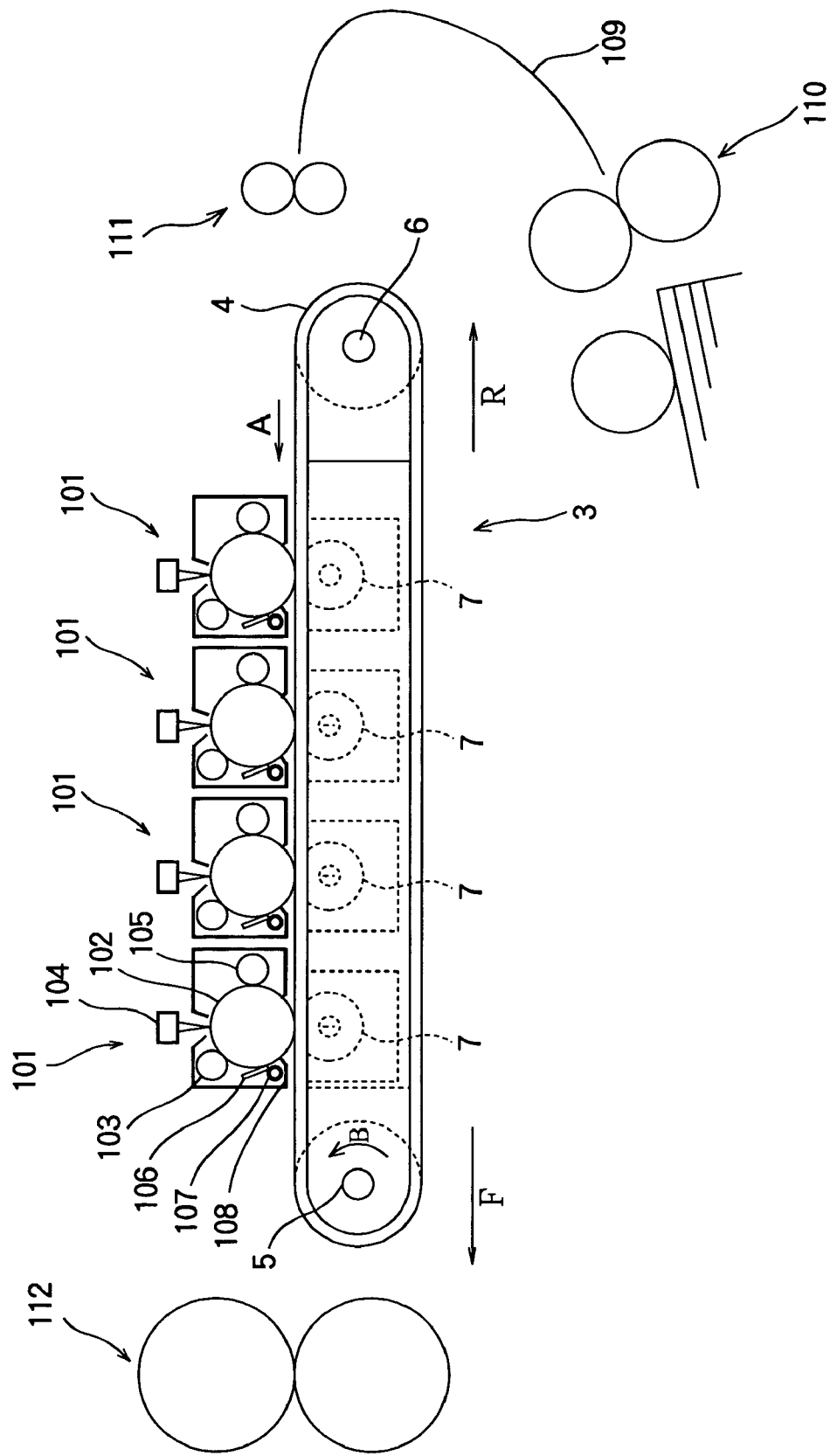
FIG. 1 shows a basic structure of an image forming apparatus including a belt unit according to the first embodiment of the present invention.

FIG. 1 shows the basic structure of an image forming apparatus using a belt unit 3 according to the first embodiment of the present invention. The image forming apparatus is constructed to form an image using electrophotographic technology. The image forming apparatus has a belt unit 3 including a drive roller 5, an idle roller 6 and an endless belt 4 stretched around the drive roller 5 and the idle roller 6. The drive roller 5 is driven by a not shown motor (i.e., a driving source) and rotates counterclockwise as indicated by an arrow B in FIG. 1 so that the endless belt 4 moves in a loop as indicated by an arrow A in FIG. 1. The idle roller 6 is urged by a spring 11 (described later) in the direction away from the drive roller 5 so that a tension is applied to the endless belt 4. Four transfer rollers 7 are arranged in a line between the drive roller 5 and the idle roller 6. The drive roller 5 side of the belt unit 3 is referred to as "front", as indicated by an arrow F in FIG. 1. The idle roller 6 side of the belt unit 3 is referred to as "rear", as indicated by an arrow R in FIG. 1.

Four toner image forming units 101 are respectively provided on the upper sides of the transfer rollers 7. The toner image forming units 101 respectively oppose the transfer rollers 7 via the endless belt 4. Each toner image forming unit 101 includes a cylindrical photosensitive body 102 that rotates clockwise in FIG. 1. Along the circumference of the photosensitive body 102, a charging device 103, an exposing device 104, a developing device 105, and a cleaning blade 106 are disposed in this order in the rotational direction of the photosensitive body 102. The charging device 103 uniformly charges the surface of the photosensitive body 102. The exposing device 104 irradiates the surface of the photosensitive body 102 with light to form a latent image. The developing device 105 develops (i.e., visualizes) the latent image on the surface of the photosensitive drum 102 with toner. The cleaning blade 106 removes the residual toner remaining on the surface of the photosensitive body 102. On the lower side of each cleaning blade 106, a toner accommodating portion 108 is provided for accommodating the waste toner. In the toner accommodating portion 108, a conveyor mechanism 107 is provided for ejecting the waste toner. Each of the above described transfer rollers 7 is applied to a voltage having a polarity opposite to the polarity of the toner adhering to the surface of the photosensitive body 102.

The image forming apparatus includes a medium supplying portion 110 at the lower side of the belt unit 3. The medium supplying portion 110 supplies a recording medium 109 to a feeding path in succession. An alignment portion 111 is provided on the feeding path of the recording medium 109 between the medium supplying portion 110 and the belt unit 3. The alignment portion 111 corrects the skewing of the recording medium 109, and feeds the recording medium 109 to the belt unit 3. A fixing device 112 is provided on the downstream side (i.e., the left side in FIG. 1) of the belt unit 3. The fixing device 112 fixes the toner image (having been transferred to the recording medium 109) to the recording medium 109.

Figure 2:
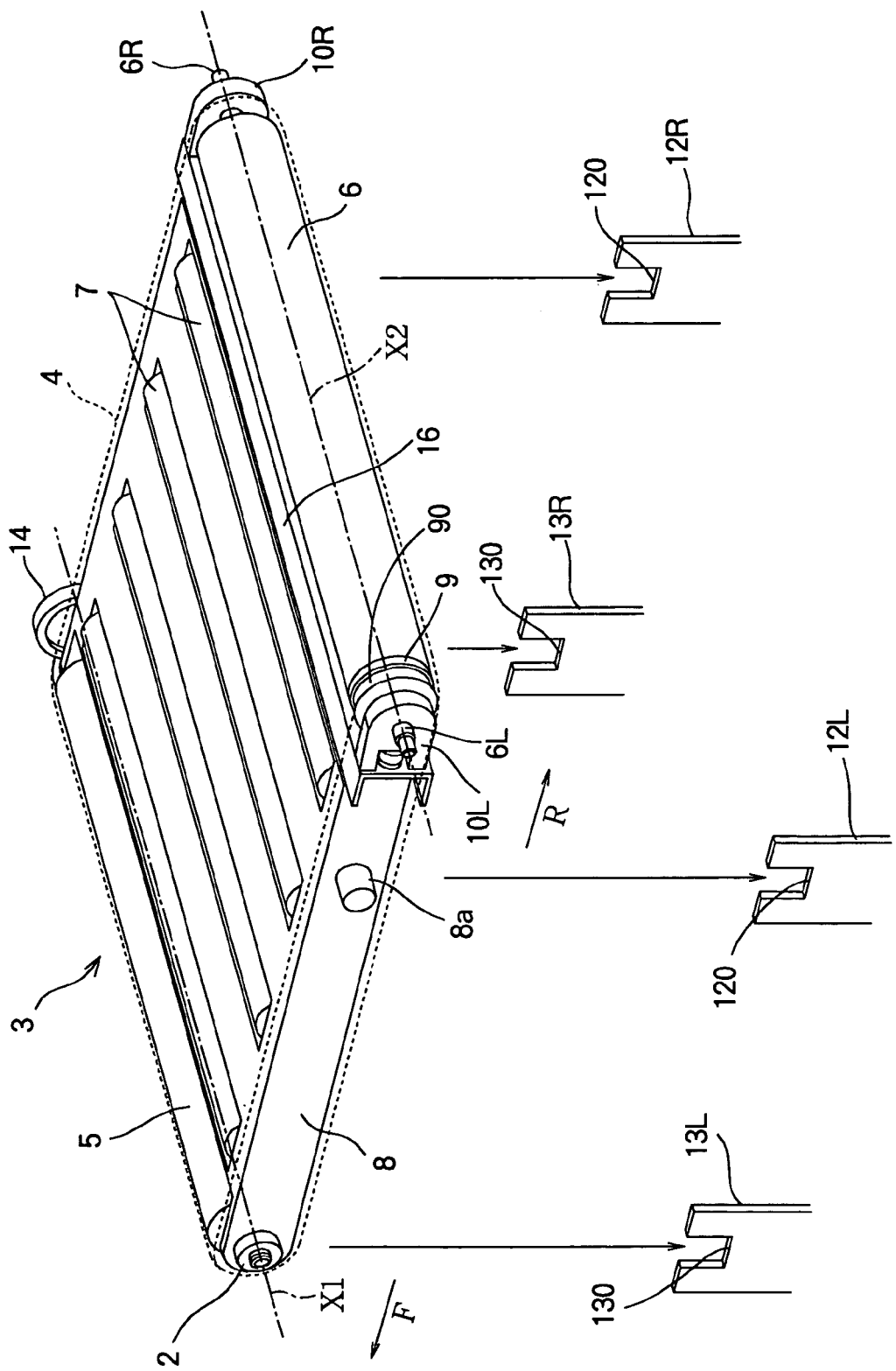
FIG. 2 is a perspective view of the belt unit according to the first embodiment of the present invention.
Figure 3:
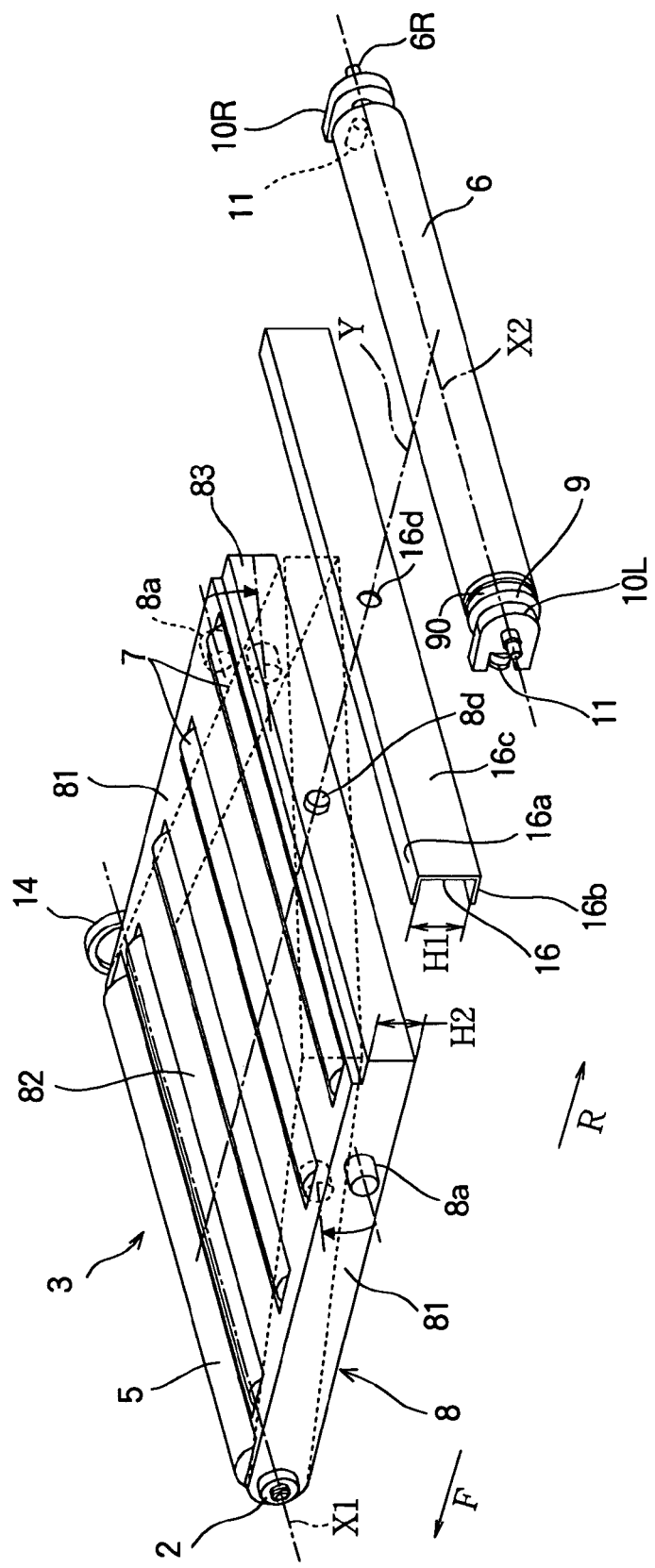
FIG. 3 is an exploded perspective view of the belt unit according to the first embodiment of the present invention.

FIGS. 2 and 3 are a perspective view and an exploded perspective view of the belt unit 3 according to the first embodiment. As shown in FIG. 2, the drive roller 5, the idle roller 6 and the transfer roller 7 are rotatably supported by a common belt frame (i.e., a first supporting member) 8 of the belt unit 3. The drive roller 5 has a surface layer made of a material (for example, a rubber) having a high friction efficiency. The drive roller 5 is supported by bearings 2 on the belt frame 8 so that the drive roller 5 is rotatable about a rotation axis X1. A gear 14 is fixed to one of the shaft portions of the drive roller 5, and is driven by a not shown driving mechanism. The endless belt 4 (stretched around the drive roller 5 and the idle roller 6) can be made by forming a material into a tubular shape. Alternatively, the endless belt 4 can be made by bonding two ends of a sheet-shaped belt. In FIG. 3 and exploded perspective views (FIGS. 9, 12 and 15) described later, the endless belt 4 is omitted.

Figure 4:
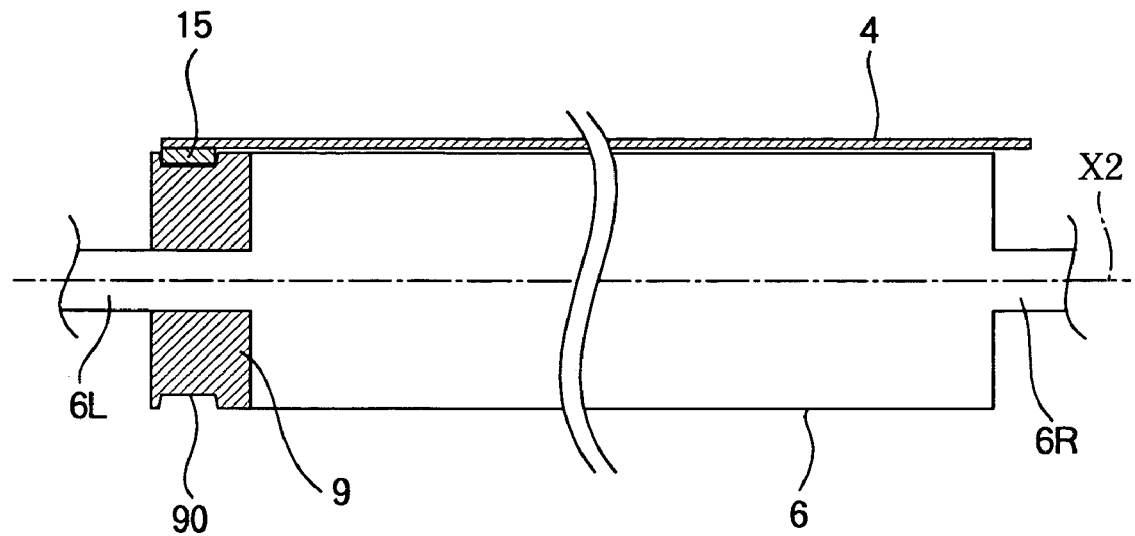
FIG. 4 is a sectional view of the idle roller of the belt unit according to the first embodiment of the present invention.

The idle roller 6 is a driven roller, and has shaft portions 6L and 6R supported by bearing members 10L and 10R so that the idle roller 6 is rotatable about a rotation axis X2. A pulley (i.e., an engaging member) 9 is fixed to one end of the idle roller 6 in the axial direction. FIG. 4 is a sectional view of the pulley 9 fixed to the idle roller 6. As shown in FIG. 4, the pulley 9 has a groove 90 extending in the circumferential direction. A bead (i.e., a regulating member) 15 is bonded to the inner surface of the endless belt 4, and engages the groove 90 of the pulley 9 so that the skewing of the endless belt 4 can be prevented.

As shown in FIG. 3, the belt frame 8 has a pair of side walls 81 on both ends of the endless belt 4 in the width direction. Partition walls 82 are formed between the side walls 81. The partition walls 82 partition a space between the side walls 81 into sections for the drive roller 5, the transfer rollers 7 and the idle roller 6. The side walls 81 project frontward beyond the front-most partition wall 82, and the above described bearings 2 are mounted on the projecting portions of the side walls 81. A rear wall 83 extend in the left-right direction between the rear ends of the side walls 81. A boss (i.e., a projection) 8d, substantially in the shape of a cylinder, projects rearward from the rear surface of the rear wall 83 toward the idle roller 6. The boss 8d is disposed on the center position of the belt frame 8 in the width direction, i.e., the center position of the drive roller 5 in the axial direction.

A pair of posts (i.e., positioning members) 8a project outward from the outer end surfaces of the side walls 81 of the belt frame 8. The posts 8a are provided for positioning the belt unit 3 in the image forming apparatus. The posts 8a engage positioning members 12L and 12R (described later) of the image forming apparatus when the belt unit 3 is mounted to the image forming apparatus.

An idle roller frame (i.e., a second supporting member) 16 is mounted on the rear wall 83 of the belt frame 8. The idle roller frame 16 is an elongated member having a rectangular U-shaped cross section. The idle roller frame 16 includes top and bottom plates 16a and 16b parallel to each other and a vertical plate 16c that connects the top and bottom plates 16a and 16b. A circular engaging hole 16d is formed on the vertical plate 16c. The engaging hole 16d is disposed at the center of the longitudinal direction and at the center of the width direction of the vertical plate 16c. The gap H1 between the top plate 16a and the bottom plate 16b is greater than the height H2 of the rear wall 83.

The idle roller frame 16 is mounted on the belt frame 8 in such a manner that the engaging hole 16d engages the boss 8d of the belt frame 8 and the top and bottom plates 16a and 16b sandwich the rear wall 83 of the belt frame 8 in the vertical direction. Because of the difference between the gap H1

(between the plates 16a and 16b of the idle roller frame 16) and the height H2 of the rear wall 83 of the belt frame 8, the idle roller frame 16 is relatively rotatable with respect to the belt frame 8. The rotating axis Y of the idle roller frame 16 is defined by the boss 8d and the engaging hole 16d. The rotating axis Y is perpendicular to the axial direction of the drive roller 5 and aligned with the center position of the drive roller 5 in the axial direction (i.e., the center position of the belt frame 8 in the width direction).

Figure 5:
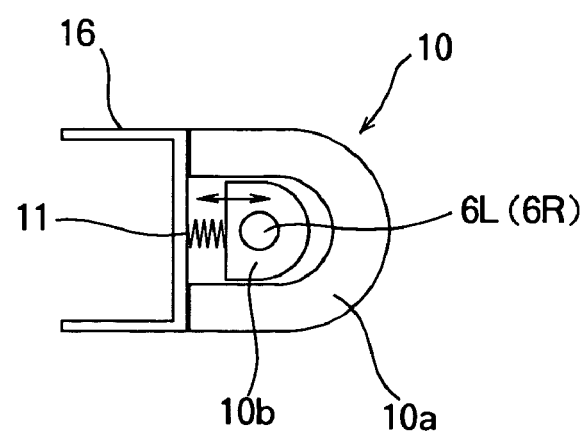
FIG. 5 shows a bearing portion of the idle roller of the belt unit according to the first embodiment of the present invention.

The bearing members 10L and 10R are disposed on the rear side (opposite side to the belt frame 8 side) of the idle roller frame 16 for supporting the shaft portions 6L and 6R of the idle roller 6. FIG. 5 is an enlarged view illustrating each of the bearing members 10L and 10R. Each of the bearing members 10L and 10R (denoted by numeral 10 in FIG. 5) includes a substantially U-shaped outer portion 10a and an inner portion 10b slidably provided inside the outer portion 10a. Two ends of the U-shaped outer portion 10a are fixed to the rear surface of the idle roller frame 16. The inner portion 10b supports the shaft portion 6L (6R) of the idle roller 6. The inner portion 10b is slidably supported by the outer portion 10a in the front-rear direction (i.e., the direction toward and away from the idle roller 5), and is urged by a spring 11 in the direction away from the idle roller 5. In the other figures (FIGS. 2 and 3) of the first embodiment, and in figures of the other embodiments, the outer portion 10a and the inner portion 10b of each bearing member 10 (FIG. 5) are omitted.

As shown in FIG. 2, positioning members 12L, 12R, 13L and 13R are provided in the image forming apparatus. The positioning members 12L and 12R have grooves 120 which receive the pair of posts 8a of the belt frame 8. The positioning members 13L and 13R have grooves 130 which receive the pair of bearings 2 of the drive roller 5. The grooves 120 and 130 open upward. By fitting the posts 8a into the respective grooves 120 of the positioning members 12L and 12R from above, and by fitting the bearings 2 into the respective grooves 130 of the positioning members 13L and 13R from above, the position of the belt frame 8 is determined in the image forming apparatus. With such a structure, the belt unit 3 is attachable to and detachable from the main body of the image forming apparatus.

Next, the operation of the image forming apparatus will be described. In FIG. 1, the recording medium 109 is supplied by the medium supplying portion 110. After the skew or the like of the recording medium 109 is corrected at the alignment portion 111, the recording medium 109 is fed to the belt unit 3. In the belt unit 3, the drive roller 5 rotates, and the endless belt 4 moves in a loop as indicated by the arrow A, so that the recording medium 109 on the endless belt 4 passes through the respective toner image forming portions 101. In the toner image forming portions 101, the toner images of the respective colors formed on the respective photosensitive bodies 102 according to the image information are transferred to the recording medium 109 in sequence. After the toner image is transferred to the recording medium 109 at the toner image forming portions 101, the recording medium 109 is fed to the fixing device 112. In the fixing device 112, the recording medium 109 is heated and pressed so that the toner image is fixed to the recording medium 109. The recording medium 109 to which the toner image is fixed is ejected through a not shown eject port.

When the distortion of the image forming apparatus occurs, there is a possibility that the positioning members 12L, 12R, 13L and 13R may shift, with the result that the belt frame 8 may deform as schematically indicated by a broken line in FIG. 3. However, because the idle roller frame 16 is rotatable relative to the belt frame 8 about the rotation axis Y aligned with the center position of the drive roller 5 in the axial direction of the drive roller 5, the influence of the deformation of the belt frame 8 is not exerted on the idle roller frame 16.

Additionally, because the idle roller 6 is urged in the direction away from the drive roller 5 by the spring 11, the rotational position of the idle roller 6 about the rotation axis Y is determined (in a self-sustaining way) to a position where the idle roller 6 is parallel to the drive roller 5. Thus, even when the deformation of the belt frame 8 occurs, the idle roller 6 can be kept parallel to the drive roller 5. The parallelism of the drive roller 5 and the idle roller 6 is defined by the parallelism of the rotation axis X1 and X2 of the rollers 5 and 6.

Since the parallelism between the drive roller 5 and the idle roller 6 can be maintained even when the deformation of the belt frame 8 occurs, it becomes possible to prevent skewing of the endless belt 4. Further, since the skewing of the endless belt 4 is prevented, it becomes possible to prevent the bead 15 from being strongly pressed against the pulley 9 by the skewing endless belt 4. Thus, it becomes possible to prevent the bead 15 from being peeled, and to prevent the endless belt 4 from meandering.

In FIG. 3, the deformation of the belt frame 8 is shown in an exaggerated scale in order to facilitate the understanding of the effect of the first embodiment. However, the amount of the deformation of the belt frame 8 is within the difference between the gap H1 of the idle roller frame 16 and the height H2 of the rear wall 83 of the belt frame 8.

As described above, according to the belt unit of the first embodiment, the idle roller frame 16 is rotatable relative to the belt frame 8 about the rotation axis Y aligned with the center position of the drive roller 5 in the axial direction, and therefore the influence of the deformation of the belt frame 8 is not exerted on the idle roller frame 16. Thus, the parallelism between the drive roller 5 and the idle roller 6 can be maintained, and therefore it becomes possible to prevent skewing of the endless belt 4 even when the deformation of the belt frame 8 occurs. As a result, it becomes possible to prevent the bead 15 from being peeled, and to prevent the endless belt 4 from meandering.

Second Embodiment

Figure 6:
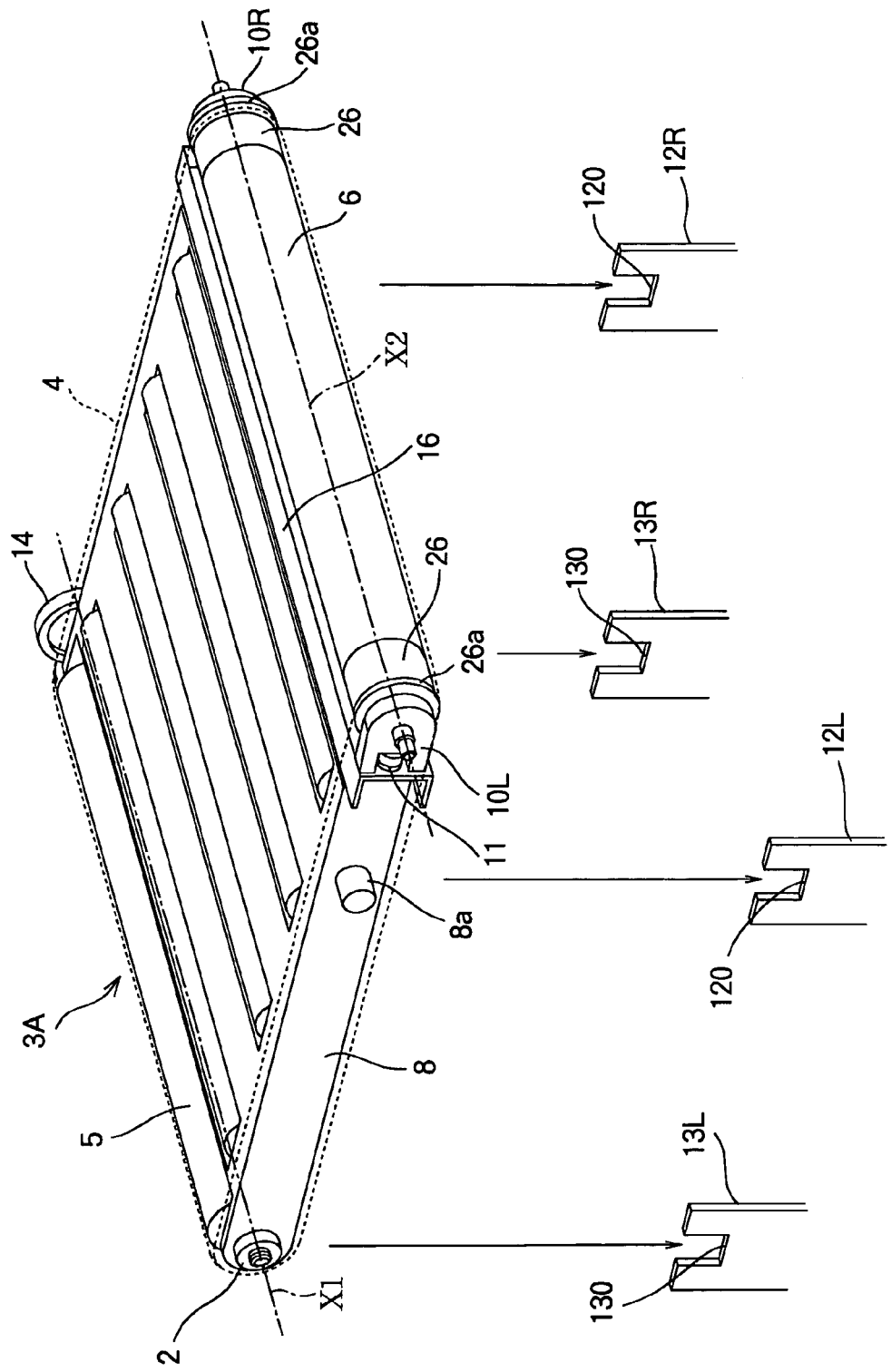
FIG. 6 is a perspective view of a belt unit according to the second embodiment of the present invention.

FIG. 6 is an exploded perspective view of a belt unit 3A according to the second embodiment of the present invention. In FIG. 6, the components that are the same as those of the first embodiment are assigned the same reference numerals. The belt unit 3A of this embodiment is different from the belt unit 3 of the first embodiment in the structure of the idle roller 6. The components of the belt unit 3A other than the idle roller 6 are the same as those of the belt unit 3 of the first embodiment. The belt unit 3A of this embodiment is used in the image forming apparatus shown in FIG. 1.

Figure 7:
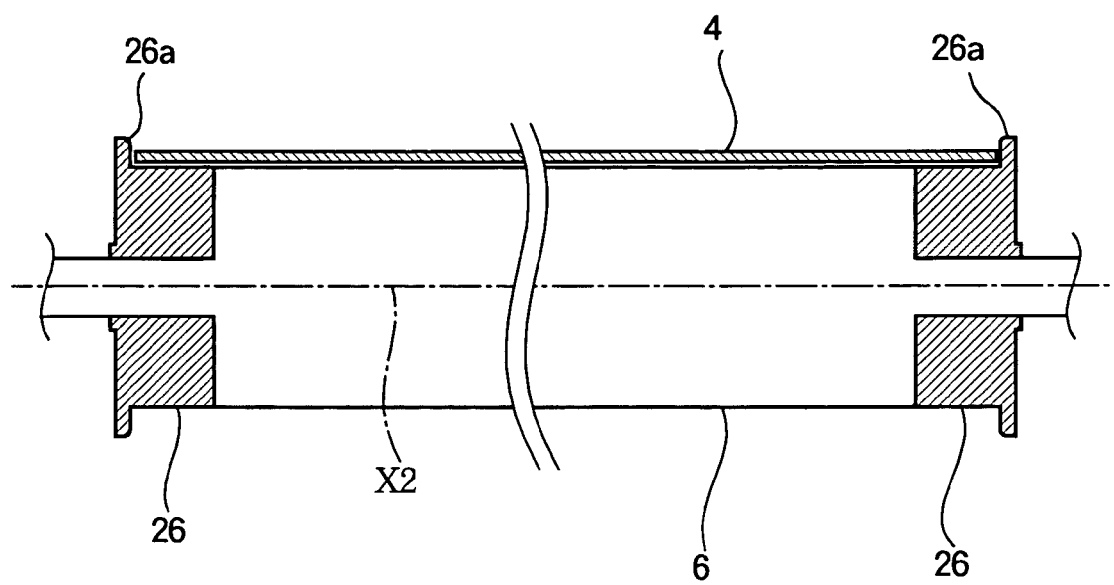
FIG. 7 is a sectional view of an idle roller of the belt unit according to the second embodiment of the present invention.

FIG. 7 is a sectional view of the idle roller 6 of the belt unit 3A shown in FIG. 6. In this embodiment, no bead 15 (FIG. 4) is fixed to the inner surface of the endless belt 4. In order to prevent skewing of the endless belt 4, ring-shaped guide members 26 are attached to both ends of the idle roller 6 in the axial direction. The guide members 26 have flange portions (i.e., a regulating mechanism) 26a that guide both ends of the endless belt 4 in the width direction. The distance between both flange portions 26a is wider than the width of the endless belt 4. If the endless belt 4 starts skewing, one end of the endless belt 4 in the width direction abuts against one of the flange portions 26a, so as to prevent skewing of the endless belt 4.

In the second embodiment, it becomes possible to maintain the parallelism between the drive roller 5 and the idle roller 6 even when the deformation of the belt frame 8 occurs, and therefore the skewing of the endless belt 4 can be prevented as was described in the first embodiment. Further, even when the endless belt 4 starts skewing, one end of the endless belt 4 in the width direction abuts against the flange portion 26a of the guide member 26, and therefore the amount of the skewing of the endless belt 4 can be restricted to a small amount. As a result, it becomes possible to eliminate the bead 15 (FIG. 4) that needs to be fixed to the endless belt 4 with high positioning accuracy, and therefore the: manufacturing cost of the belt unit 3A can be reduced.

As described above, according to the second embodiment, because of the provision of the guide members 26 (the flange portions 26a) on the idle roller 6, it becomes possible to restrict the skewing of the endless belt 4 without using the bead 15 (FIG. 4). As a result, it becomes possible to obtain the advantage of reducing the manufacturing cost of the belt unit 3A, in addition to the advantages of the first embodiment.

Third Embodiment

Figure 8:
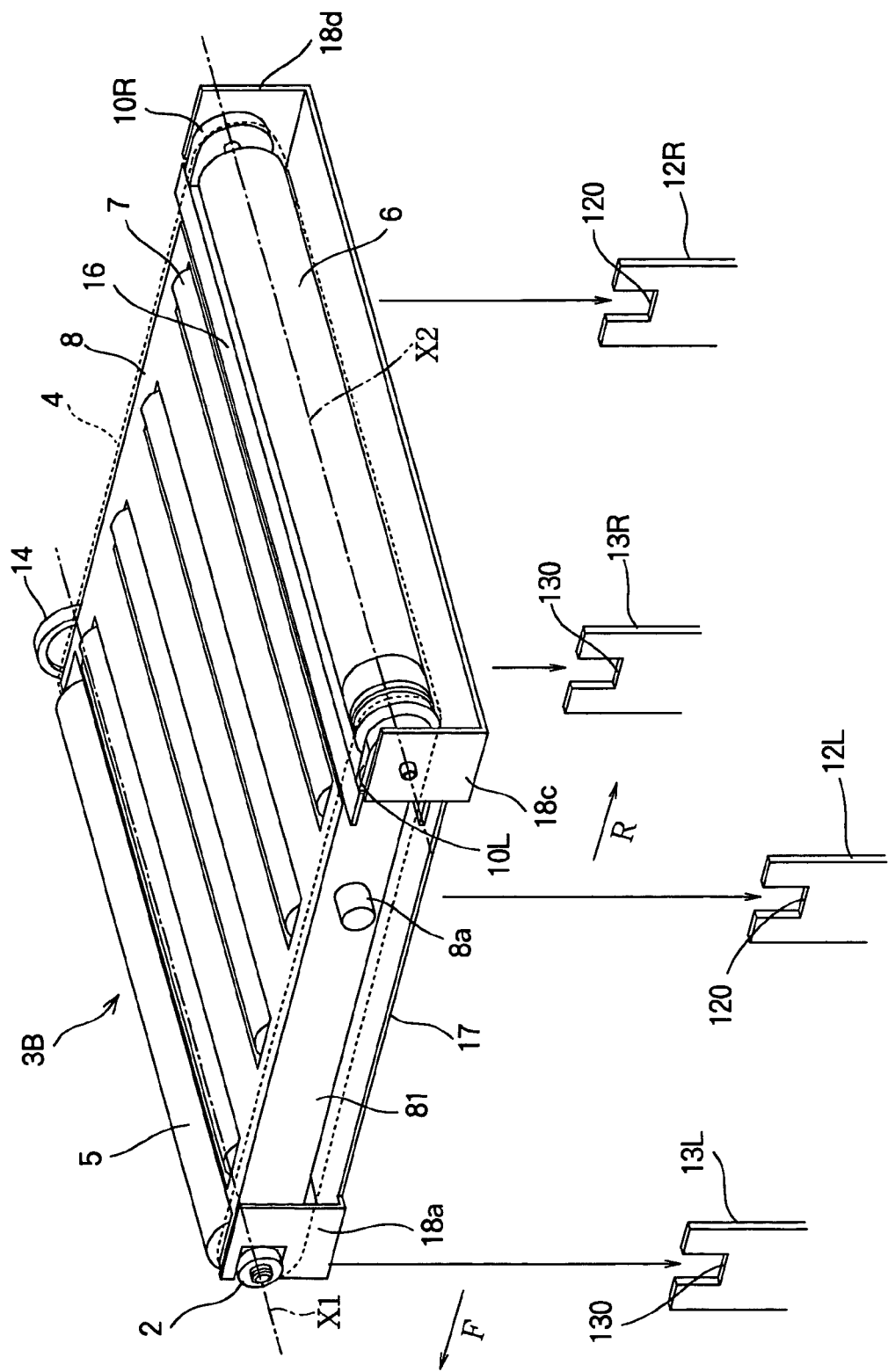
FIG. 8 is a perspective view of a belt unit according to the third embodiment of the present invention.
Figure 9:
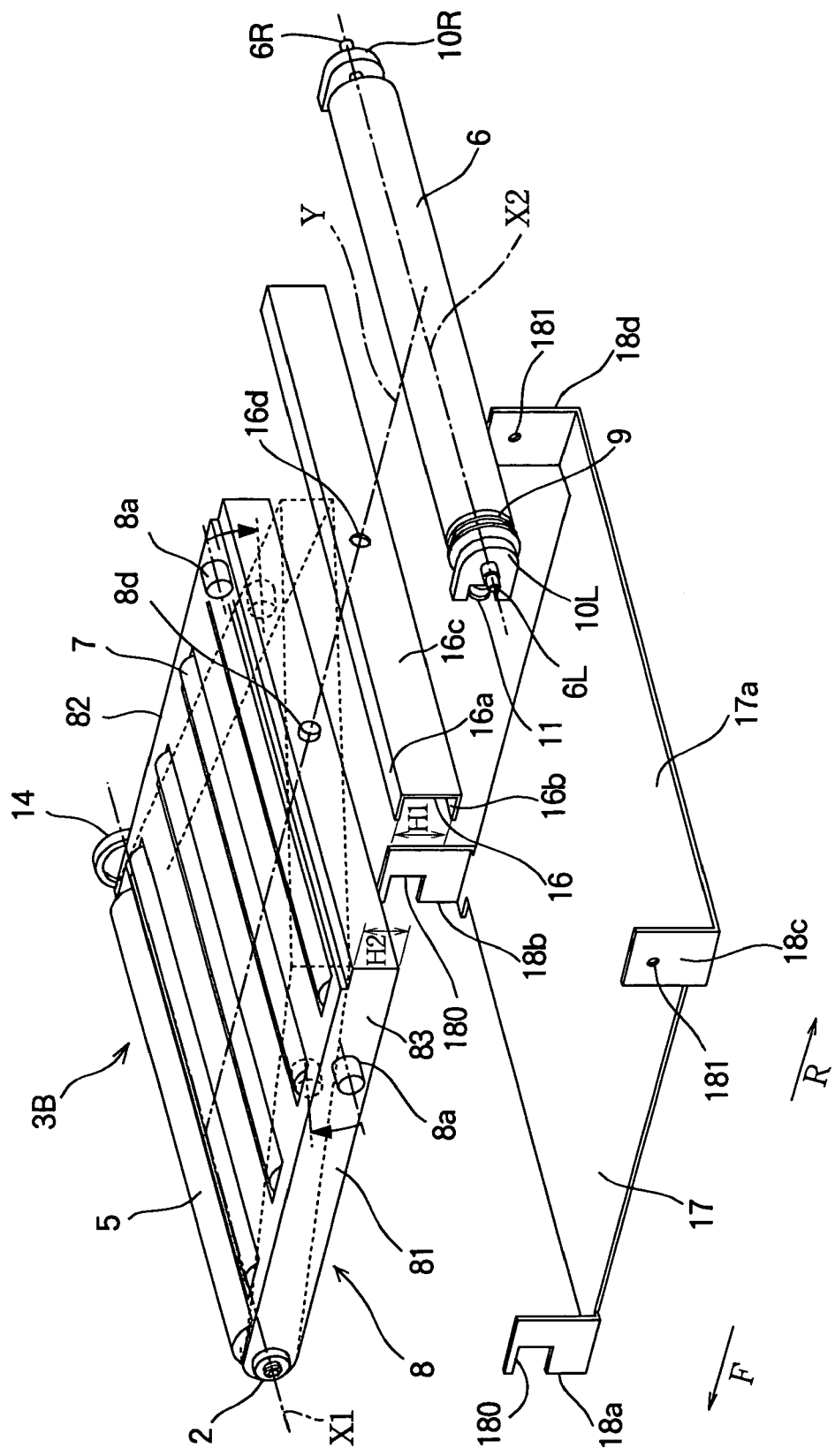
FIG. 9 is an exploded perspective view of the belt unit according to the third embodiment of the present invention.

FIGS. 8 and 9 are a perspective view and an exploded perspective view of a belt unit 3B according to the third embodiment. In FIGS. 8 and 9, the components that are the same as those of the first embodiment are assigned the same reference numerals. The belt unit 3B of the third embodiment is used in the image forming apparatus shown in FIG. 1.

As shown in FIG. 8, the drive roller 5 is supported by the belt frame 8 via the bearings 2, and the idle roller 6 is supported by the idle roller frame 16 via the bearing members 10L and 10R. The belt frame 8 has posts 8a at both side walls 81 in the width direction, for positioning the belt unit 3B in the image forming apparatus. The belt frame 8 has another post 8d (FIG. 9) formed on the rear wall 83, which defines the rotation axis Y. The idle roller frame 16 is rotatable relative to the belt frame 8 about the rotation axis Y.

Additionally, the belt unit 3B has a stabilizer frame (i.e., a parallelism maintaining mechanism) 17 made of a rigid body. The stabilizer frame 17 is provided for further enhancing the parallelism between the drive roller 5 and the idle roller 6. As shown in FIG. 9, the stabilizer frame 17 includes a flat plate portion 17a substantially in the shape of a rectangular flat plate. The flat plate portion 17a is integrally formed with shaft holding portions 18a and 18b that support the bearing portions 2 of the drive roller 5. Further, the flat plate portion 17a is integrally formed with shaft holding portions 18c and 18d that support the bearing members 10L and 10R of the idle roller 6.

The shaft holding portions 18a and 18b face each other so that the belt frame 8 can be placed therebetween. The shaft holding portions 18a and 18b have grooves 180 that open frontward and engage the outside of the bearings 2 of the drive roller 5. The shaft holding portions 18c and 18d face each other so that the idle roller 6 can be placed therebetween. The shaft holding portions 18c and 18d have through holes 181 having dimensions enough to engage the shaft portions 6L and 6R of the idle roller 6. A line connecting the centers of the grooves 180 of the shaft holding portions 18a and 18b is parallel to a line connecting the centers of the through holes 181 of the shaft holding portions 18c and 18d.

As shown in FIG. 8, when the stabilizer frame 17 is attached to the outside of the belt frame 8, the bearings 2 of the drive roller 5 engage the grooves 180 of the shaft holding portions 18a and 18b, and the shaft portions 6L and 6R of the idle roller 6 engage the through holes 181 of the shaft holding portions 18c and 18d. Further, when the belt frame 8 (to which the stabilizer frame 17 is attached) is mounted in the image forming apparatus, the bearings 2 of the drive roller 5 engage the grooves 130 of the positioning members 13L and 13R, and the posts 8a engage the grooves 120 of the positioning members 12L and 12R.

As was described in the first embodiment, if the distortion or the like of the image forming apparatus occurs, there is a possibility that the belt frame 8 may deform as indicated by a broken line in FIG. 9. However, the idle roller 16 is rotatable relative to the belt frame 8 about the rotation axis Y aligned with the center position of the drive roller 5 in the axial direction, and therefore the influence of the deformation of the belt frame 8 is not exerted on the idle roller frame 16 (and the idle roller 6 supported by the idle roller frame 16).

Additionally, in this embodiment, it becomes possible to enhance the parallelism of the drive roller 5 and the idle roller 6 because the positions of the bearings 2 of the drive roller 5 are vertically restricted by the stabilizer frame 17, and the positions of the shaft portions 6L and 6R are restricted by the stabilizer frame 17.

There may be cases where the circumferential lengths at left and right ends of the endless belt 4 are different from each other. Further, there may be cases where the circumferential lengths at left and right ends of the drive roller 5 (or the idle roller 6) are different from each other. In such cases, it may be difficult to maintain the parallelism between the drive roller 5 and the idle roller 6 by means of the force of the spring 11. However, in this embodiment, the stabilizer frame 17 (i.e., a rigid body) holds the drive roller 5 and the idle roller 6 in parallel to each other, even when the circumferential lengths at the left and right ends of the endless belt 4 (as well as the drive roller 5 or the idle roller 6) are different from each other.

As described above, according to the third embodiment, because of the provision of the stabilizer frame 17, it becomes possible to maintain the parallelism between the drive roller 5 and the idle roller 6 even when the circumferential lengths at the left and right ends of the endless belt 4 (as well as the drive roller, 5 or the idle roller 6) are different from each other, in addition to the advantages described in the first embodiment. Therefore, it becomes possible to prevent skewing of the endless belt 4, without causing the peeling of the bead 15 (FIG. 4) or the meandering of the endless belt 4.

Although the shaft holding portions 18a and 18b of the stabilizer frame 17 support the bearings 2 of the drive roller 5 in the above description, it is also possible that the stabilizer frame 17 directly supports the shaft portions of the drive roller 5. Further, although the shaft holding portions 18c and 18d of the stabilizer frame 17 support the shaft portions 6L and 6R of the idle roller 6 in the above description, it is also possible that the shaft holding portions 18c and 18d of the stabilizer frame 17 support the bearing members 10L and 10R of the idle roller 6. Furthermore, in FIG. 9, the deformation of the belt frame 8 is shown in an exaggerated scale in order to facilitate the understanding of the effect of third embodiment. However, the amount of the deformation of the belt frame 8 is within the difference between the gap H1 of the idle roller frame 16 and the height H2 of the rear wall 83 of the belt frame 8.

Fourth Embodiment

Figure 10:
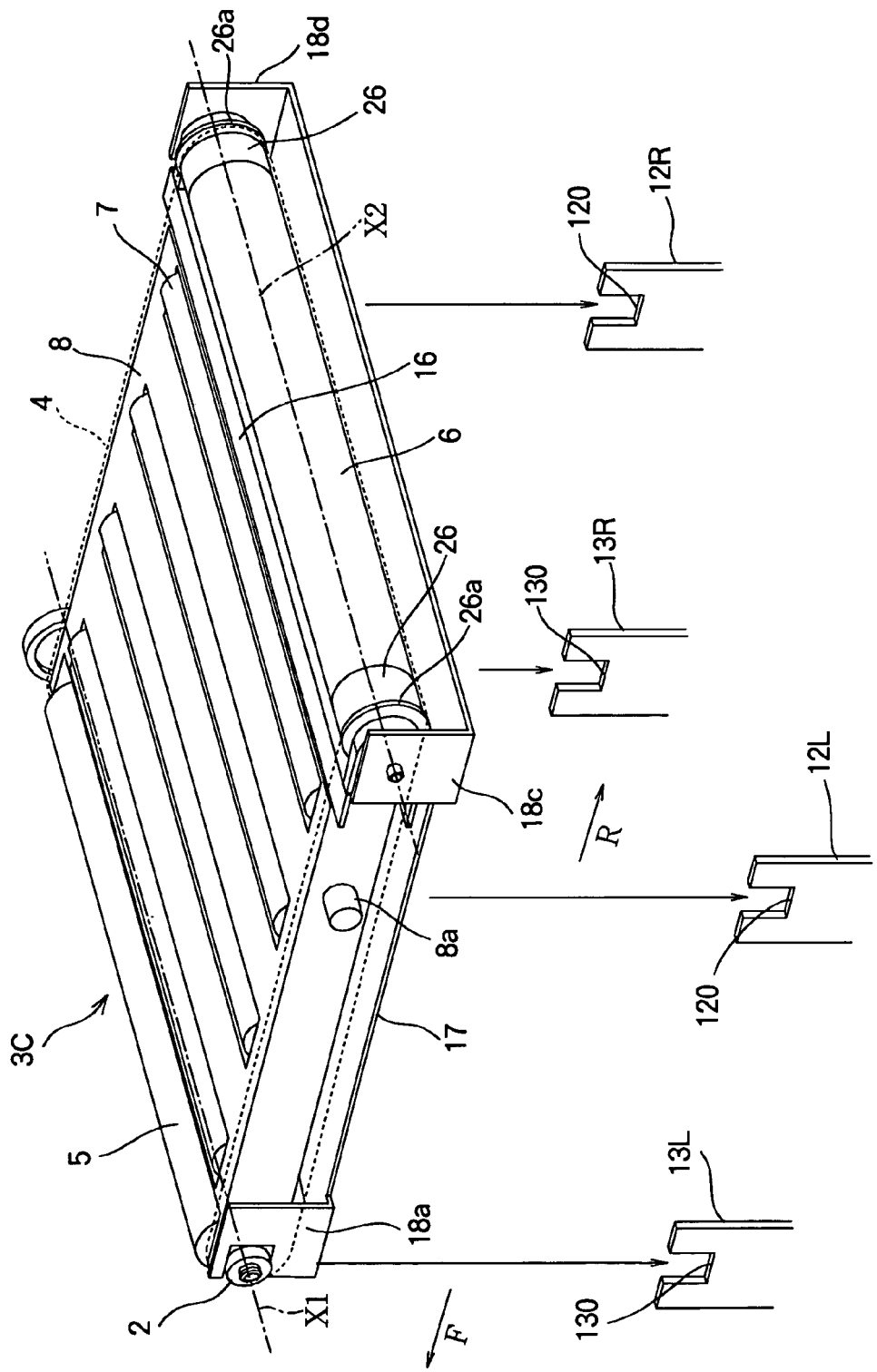
FIG. 10 is a perspective view of a belt unit according to the fourth embodiment of the present invention.

FIG. 10 is an exploded perspective view of a belt unit 3C according to the fourth embodiment of the present invention. The components that are the same as those of the first embodiment are assigned the same reference numerals. In the belt unit 3C of the fourth embodiment, the idle roller 6 of the second embodiment is employed in the belt unit 3B of the third embodiment. The components of the belt unit 3C other than the idle roller 6 are the same as those of the belt unit 3B of the third embodiment shown in FIG. 8. The belt unit 3C is used in the image forming apparatus shown in FIG. 1.

In this fourth embodiment, ring-shaped guide members 26 are attached to both ends of the idle roller 6 in the axial direction of the idle roller 6 as was described in the second embodiment. The guide members 26 have flange portions 26a that guide both ends of the endless belt 4 in the width direction. When the endless belt 4 starts skewing, one end of the endless belt 4 in the width direction abuts against one of the flange portions 26a so as to restrict the skewing of the endless belt 4.

According to this fourth embodiment, because of the provision of the guide members 26 on the idle roller 6, it becomes possible to restrict the skewing of the endless belt 4 without using the bead 15 (FIG. 4). As a result, it becomes possible to obtain the advantage of reducing the manufacturing cost of the belt unit, in addition to the advantages of the third embodiment.

Fifth Embodiment

Figure 11:
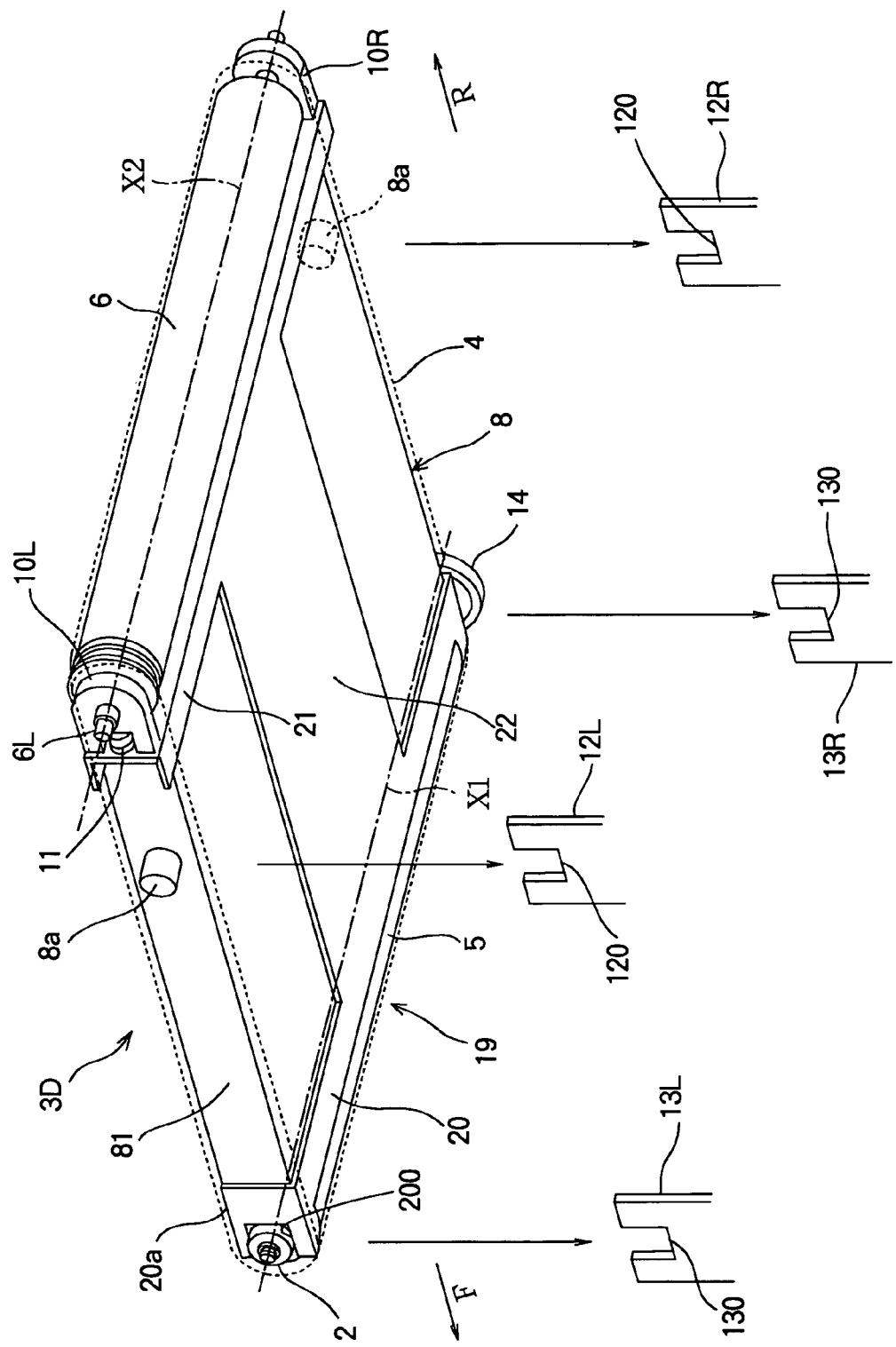
FIG. 11 is a perspective view of a belt unit according to the fifth embodiment of the present invention.
Figure 12:
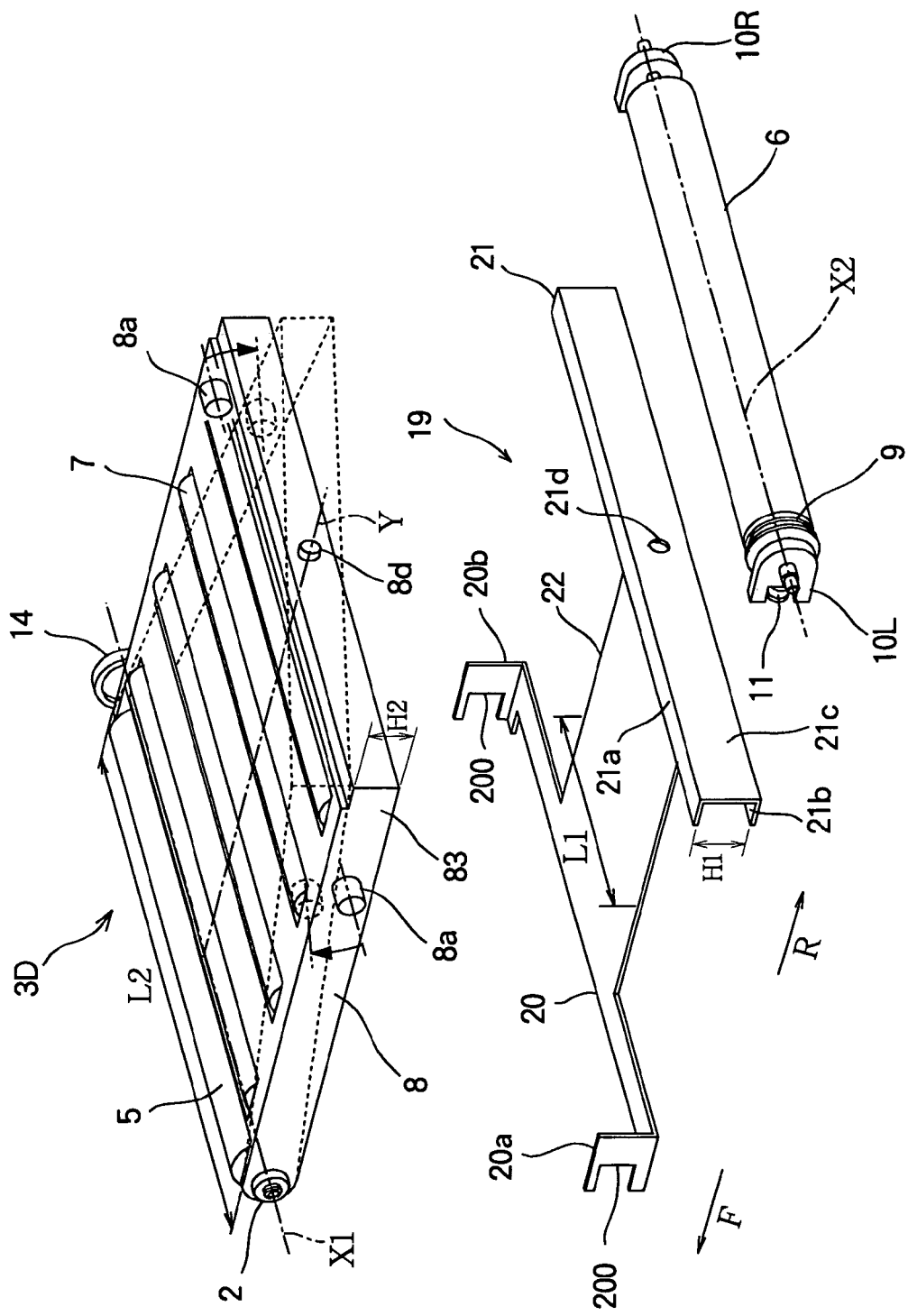
FIG. 12 is an exploded perspective view of the belt unit according to the fifth embodiment of the present invention.

FIGS. 11 and 12 are a perspective view and an exploded perspective view of a belt unit 3D according to the fifth embodiment of the present invention. The components that are the same as those of the first embodiment are assigned the same reference numerals. The belt unit 3D is used in the image forming apparatus shown in FIG. 1.

As shown in FIGS. 11 and 12, the drive roller 5 is mounted on the belt frame 8 via the bearings 2 as was described in the first embodiment. The belt frame 8 has the posts 8a on both side walls 81, and the boss 8d on the rear wall 83 as was described in the first embodiment.

In this embodiment, as shown in FIG. 12, an idle roller supporting portion 21 for supporting the idle roller 6 is integrally formed with a stabilizer frame (i.e., a parallelism maintaining mechanism) 19. The stabilizer frame 19 includes a drive roller supporting portion 20 for supporting the drive roller 5, the above described idle roller supporting portion 21 for supporting the idle roller 6, and a connecting plate 22 that connects the supporting portions 20 and 21. The drive roller supporting portion 20 has shaft holding portions 20a and 20b formed on both ends of an elongated plate in the longitudinal direction of the elongated plate. The shaft holding portions 20a and 20b face each other so that the belt frame 8 can be placed therebetween. The shaft holding portions 20a and 20b have grooves 200 that open frontward and engage the outside of the bearings 2 of the drive roller 5.

The idle roller supporting portion 21 is an elongated member elongated in left-right direction that has a rectangular U-shaped cross section. The idle roller supporting portion 21 includes top and bottom plates 21a and 21b parallel to each other and a vertical plate 21c connecting the top and bottom plates 21a and 21b. A circular engaging hole 21d is formed on the vertical plate 21c, and engages the boss 8d of the belt frame 8. The engaging hole 21d is disposed at the center position of the longitudinal direction and at the center of the width direction of the vertical plate 21c of the idle roller supporting portion 21. The gap H1 between the top and bottom plates 21a and 21b of the idle roller supporting portion 21 is larger than the height H2 of the rear wall 83 of the belt frame 8. Further, the bearing members 10L and 10R of the idle roller 6 are fixed to the vertical plate 21c of the idle roller supporting portion 21.

The connecting plate 22 connects the drive roller supporting portion 20 and the idle roller supporting portion 21 so that the supporting portions 20 and 21 are parallel to each other. The connecting plate 22 extends in the front-rear direction between the center of the bottom plate 21b of the idle roller supporting member 21 and the center of the drive roller supporting portion 20. The width L1 (i.e., the dimension in the direction perpendicular to the longitudinal direction) of the connecting plate 22 is narrower than the width L2 of the belt frame 8.

When the stabilizer frame 19 is mounted to the outside of the belt frame 8, the bearings 2 of the drive roller 5 engage the grooves 200 of the shaft holding portions 20a and 20b, and the boss 8d of the belt frame 8 engages the engaging hole 21d of the idle roller supporting portion 21. The endless belt 4 (stretched around the drive roller 5 and the idle roller 6) is wound outside the stabilizer frame 19. Further, when the belt frame 8 (to which the stabilizer frame 19 is attached) is mounted in the image forming apparatus, the bearings 2 of the drive roller 5 engage the grooves 130 of the positioning members 13L and 13R, and the posts 8a engage the grooves 120 of the positioning members 12L and 12R.

When the distortion of the image forming apparatus occurs, the belt frame 8 may deform as indicated by a broken line in FIG. 12, as was described in the first embodiment. However, according to this embodiment, the idle roller supporting portion 21 is rotatable relative to the belt frame 8 about the rotation axis Y aligned with the center position of the drive roller 5 in the axial direction, and therefore the influence of the deformation of the belt frame 8 is not exerted on the idle roller frame 16 (and the idle roller 6 supported by the idle roller supporting portion 21).

Moreover, in this embodiment, the positions of the bearings 2 of the drive roller 5 are vertically restricted by the stabilizer frame 19, and the positions of the shaft portions 6L and 6R are restricted by the stabilizer frame 19. Therefore, the parallelism between the drive roller 5 and the idle roller 6 can be enhanced.

Figure 13A:
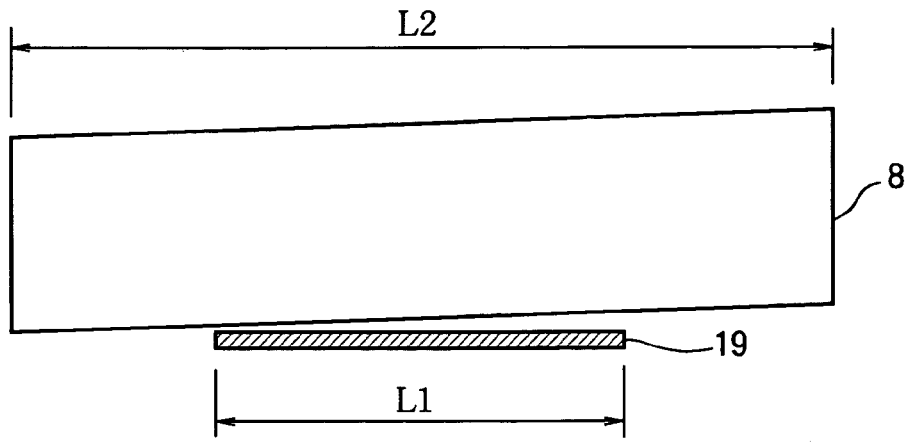
FIGS. 13A, 13B and 13C are schematic views illustrating the position and the size of a stabilizer frame of the belt unit according to the fifth embodiment of the present invention.
Figure 13B:
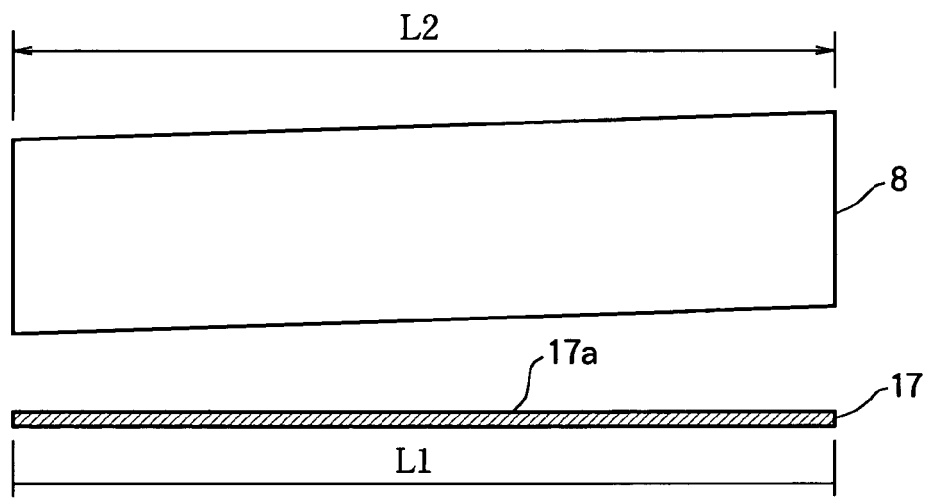
Figure 13C:
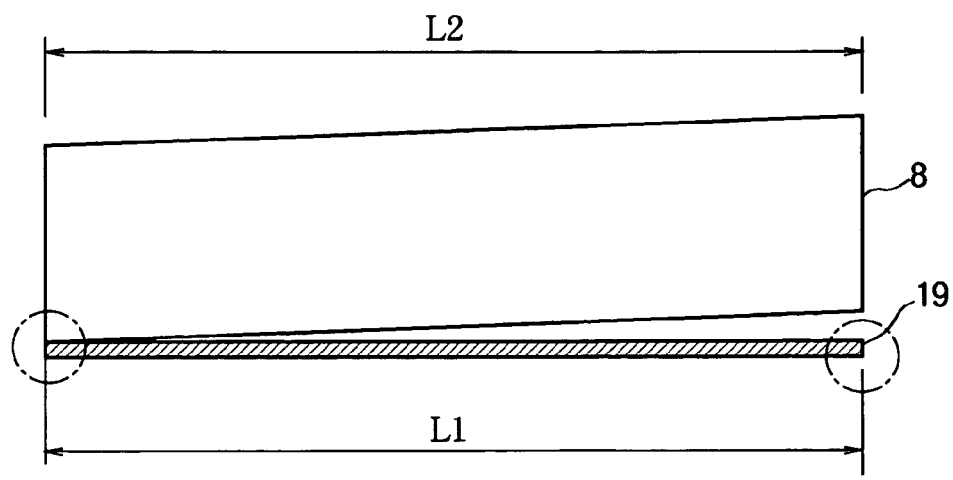

In the above described third embodiment, the stabilizer frame 17 (FIG. 8) is disposed outside the endless belt 4, and therefore a relatively large gap is provided between the belt frame 8 and the stabilizer frame 17 as schematically shown in FIG. 13B. Conversely, in this fifth embodiment, the stabilizer frame 19 is disposed inside the endless belt 4 and outside the belt frame 8, and therefore the stabilizer frame 19 and the belt frame 8 are relatively close to each other. In such a case, there is a possibility that the belt frame 8 may contact the stabilizer frame 19 when the belt frame 8 deforms as schematically shown in FIG. 13C. However, in this embodiment, the width L1 of the connecting plate 22 of the stabilizer frame 19 is narrower than the width L2 of the belt frame 8, and therefore it is possible to prevent the belt frame 8 and the stabilizer frame 19 from contacting each other even when the belt frame 8 deforms as shown in FIG. 13C.

As described above, according to this fifth embodiment, because of the provision of the stabilizer frame 19, it becomes possible to maintain the parallelism between the drive roller 5 and the idle roller 6 even when the circumferential lengths at the left and right ends of the endless belt 4 (as well as the drive roller 5 or the idle roller 6) are different from each other, in addition to the advantages described in the first embodiment. Therefore, it becomes possible to prevent skewing of the endless belt 4 without causing the peeling of the bead 15 (FIG. 4) and the meandering of the endless belt 4.

Moreover, the stabilizer frame 19 is provided inside the endless belt 4, the belt unit 3D can be as small as the belt unit having no stabilizer frame 19. Thus, the size of the belt unit 3D can be reduced.

Although the shaft holding portions 20a and 20b of the stabilizer frame 19 support the bearings 2 of the drive roller 5 in the above description, it is also possible that the stabilizer frame 19 directly supports the shaft portions of the drive roller 5. Furthermore, in FIG. 12, the deformation of the belt frame 8 is shown in an exaggerated scale in order to facilitate the understanding of the effect of the fifth embodiment. However, the amount of the deformation of the belt frame 8 is within the difference between the gap H1 of the idle roller frame 16 and the height H2 of the rear wall 83 of the belt frame 8.

Sixth Embodiment

FIG. 14 is an exploded perspective view of a belt unit 3E according to the sixth embodiment of the present invention. The components that are the same as those in the first embodiment are assigned the same reference numerals. In the belt unit 3E of the sixth embodiment, the idle roller 6 of the second embodiment is employed in the belt unit 3D of the fifth embodiment. The components of the belt unit 3E other than the idle roller 6 are the same as those of the belt unit 3D of the fifth embodiment shown in FIG. 11. The belt unit 3E is used in the image forming apparatus shown in FIG. 1.

In this sixth embodiment, ring-shaped guide members 26 are attached to both ends of the idle roller 6 in the axial direction of the idle roller 6 as was described in the second embodiment. The guide members 26 have flange portions 26a that guide the both ends of the endless belt 4 in the width direction. When the endless belt 4 starts to skew, one end of the endless belt 4 (in the width direction) abuts against one of the flange portions 26a so as to restrict the skewing of the endless belt 4.

According to this sixth embodiment, because of the provision of the guide members 26 on the idle roller 6, it becomes possible to restrict the skewing of the endless belt 4 without using the bead 15 (FIG. 4). As a result, it becomes possible to obtain the advantage of reducing the manufacturing cost of the belt unit, in addition to the advantages of the fifth embodiment.

Seventh Embodiment

Figure 15:
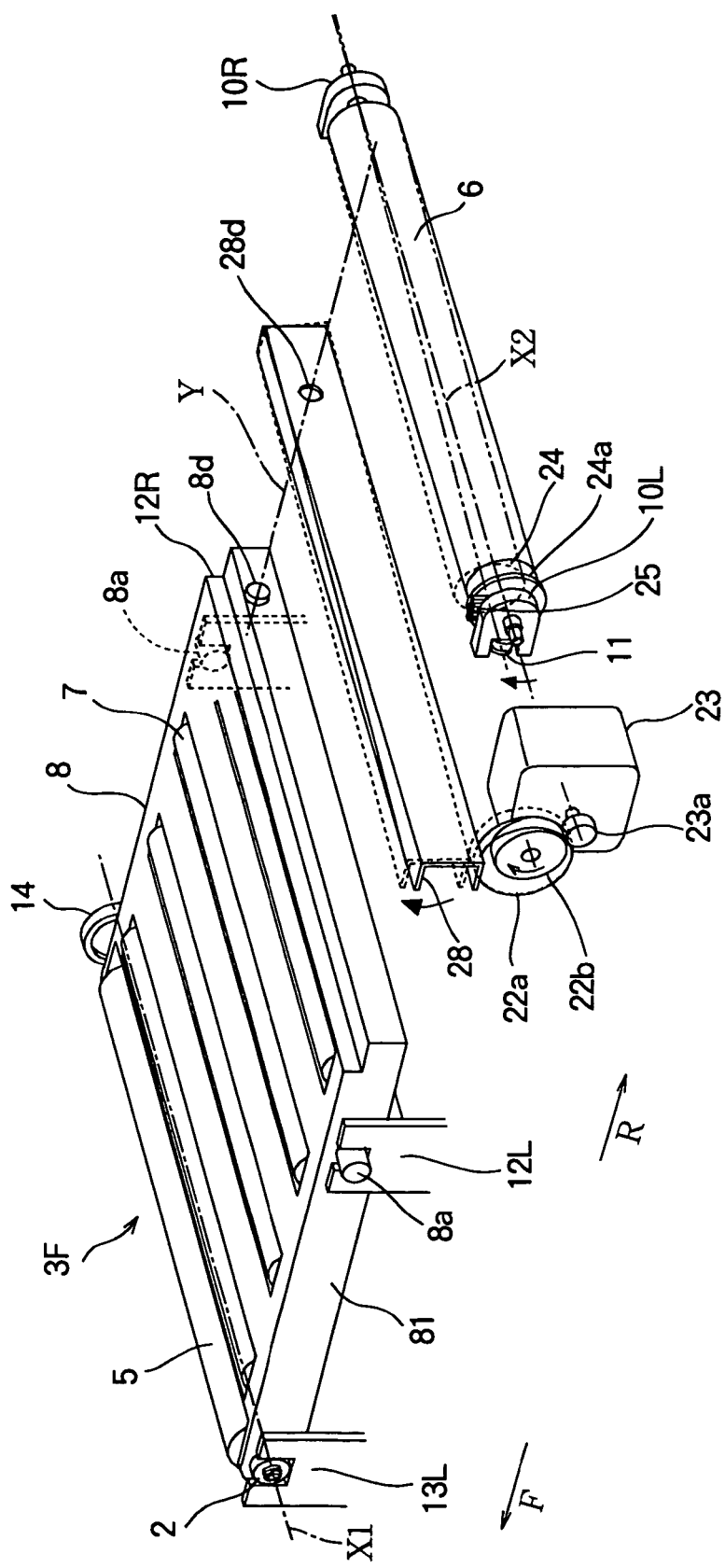
FIG. 15 is a perspective view of a belt unit according to the seventh embodiment of the present invention.

FIG. 15 is an exploded perspective view of a belt unit 3F according to the seventh embodiment of the present invention. The components that are the same as those of the first embodiment are assigned the same reference numerals. The belt unit 3F is used in the image forming apparatus shown in FIG. 1.

In this seventh embodiment, the drive roller 5 is mounted on the belt frame 8 via the bearings 2, and the idle roller 6 is mounted on an idle roller frame 28 via the bearing members 10L and 10R, as was described in the first embodiment. The posts 8a are formed on both side walls 81 of the belt frame 8 for positioning the belt frame 8. The boss 8d is formed on the rear wall 83 of the belt frame 8.

In this embodiment, the boss 8d is disposed on a remote position from the center position of the belt frame 8 in the width direction. For example, the boss 8d is disposed in the vicinity of the right end of the belt frame 8 as shown in FIG. 15. An engaging hole 28d is formed on the idle roller frame 28 so that the engaging hole 28d is engagable with the boss 8d of the belt frame 8. Thus, the rotation axis Y of the idle roller frame 28 is not aligned with the center position of the idle roller 5 (in the longitudinal direction), but aligned with the remote position from the center position of the idle roller 5.

A cam 22a contacts the left end (i.e., an end opposite to the engaging hole 28d) of the idle roller frame 28. The cam 22a abuts against the left end of the idle roller frame 28 from below. The cam 22a is an eccentric cam, and integrally formed with a gear 22b. The gear 22b engages a motor gear 23a of a motor 23. When the motor 23 rotates, the cam 22a also rotates and urges the left end of the idle roller frame 28 upward, with the result that idle roller frame 28 (and the idle roller 6 supported by the idle roller frame 28) swings about the rotation axis Y.

A guide roller 24 with a flange portion 24a is provided on the left side (i.e., the cam 22a side in the axial direction) of the idle roller 6. The guide roller 24 is rotatable about the rotation axis X2, and the flange portion 24a of the guide roller 24 is able to contact one end of the endless belt 4 in the width direction. A detection sensor (i.e., a detection unit) 25 is disposed between the guide roller 24 and the bearing member 10L. The detection sensor 25 detects the force applied to the guide roller 24 in the direction of the axis X2. The endless belt 4 has no bead 15 (FIG. 4) described in the first embodiment.

Figure 16A:
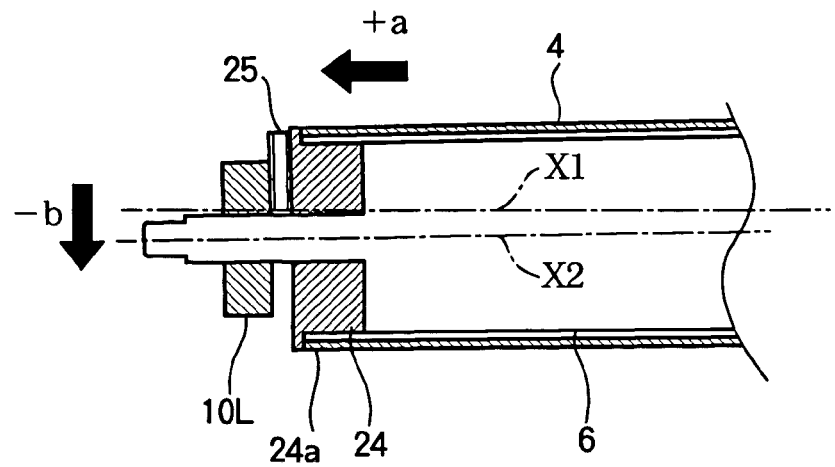
FIGS. 16A, 16B and 16C are sectional views illustrating the operation of the belt unit according to the seventh embodiment of the present invention.
Figure 16B:
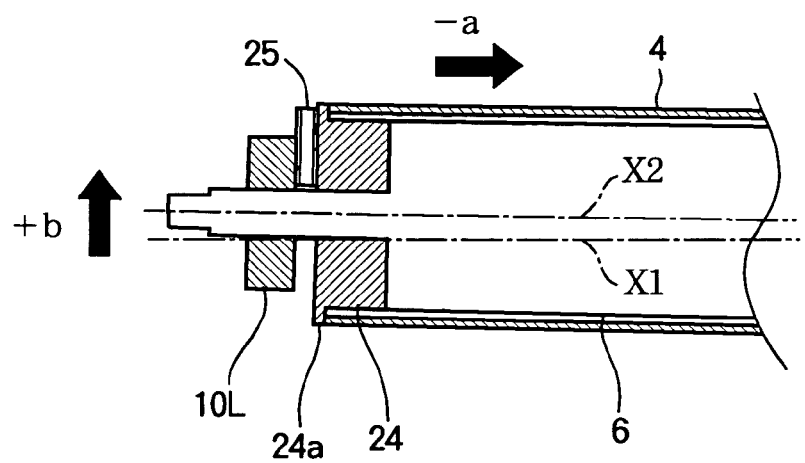
Figure 16C:
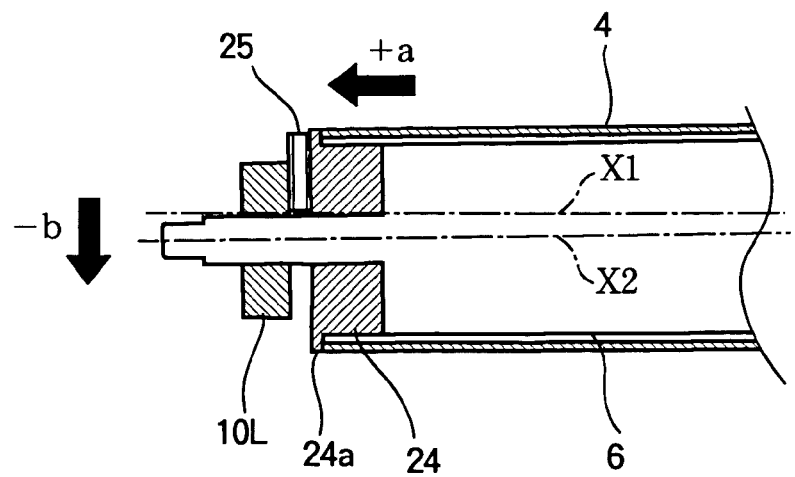
Figure 17:
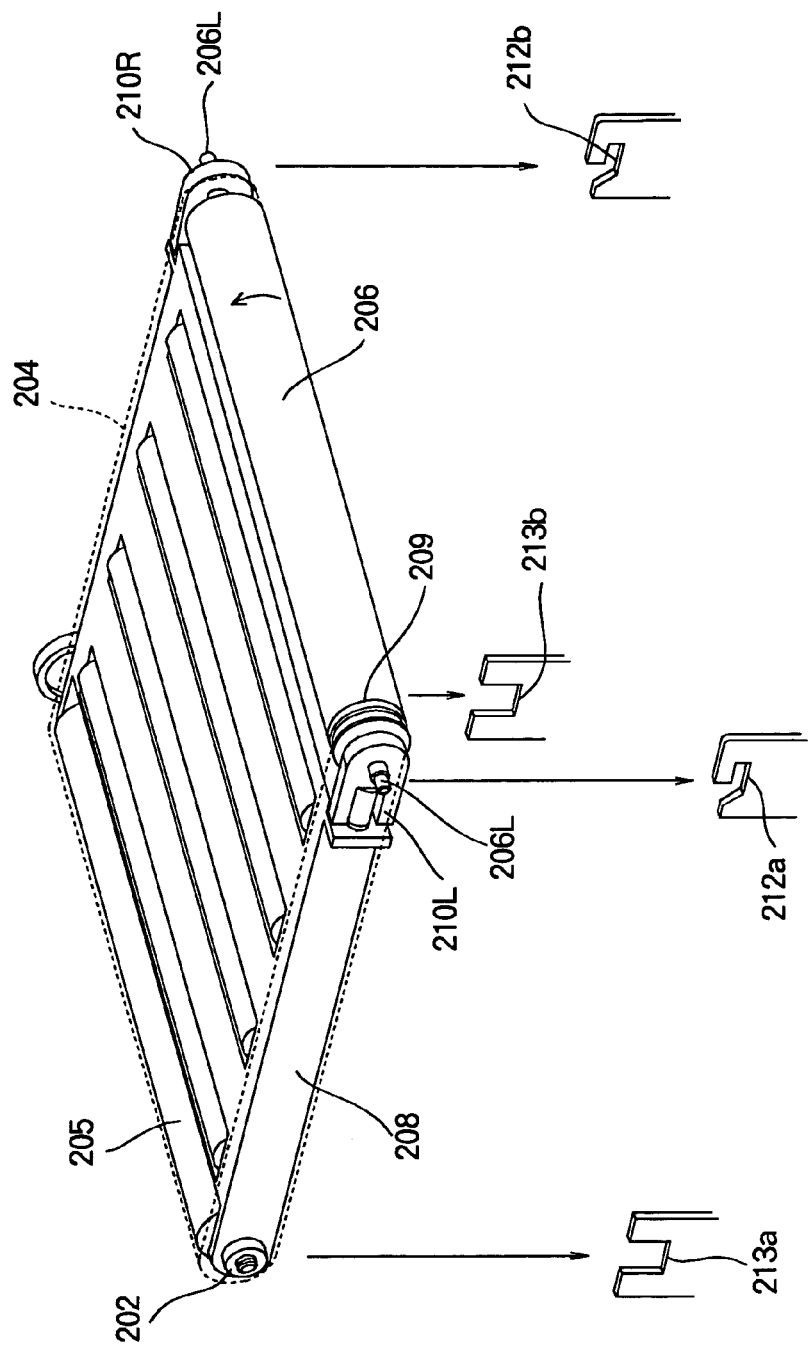
FIG. 17 is a perspective view of the conventional belt unit.
Figure 18A:
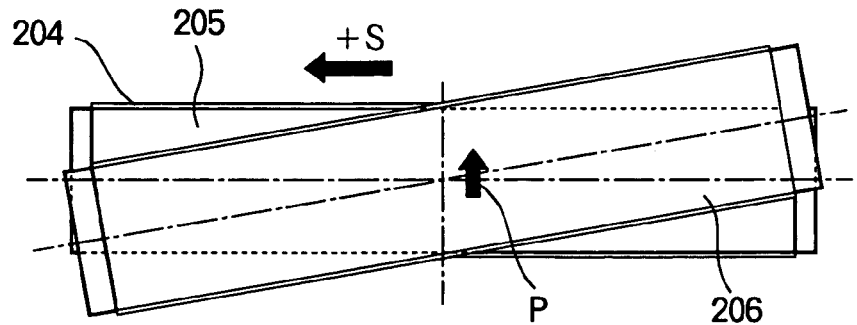
FIGS. 18A and 18B are schematic views illustrating the skewing of an endless belt of the conventional belt unit.
Figure 18B:
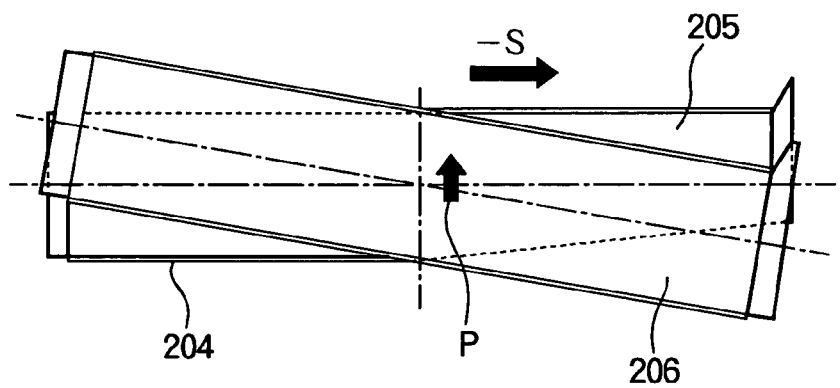
Figure 19:
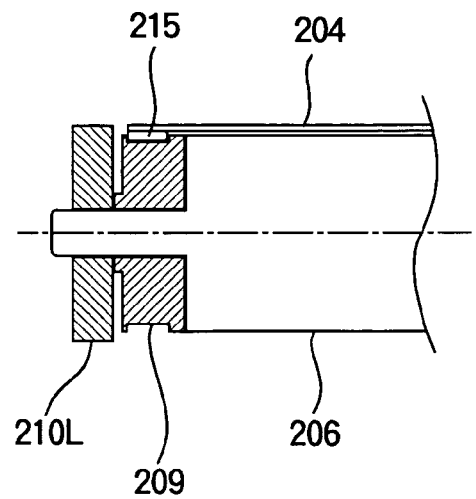
FIG. 19 is a sectional view of an arrangement for preventing the skewing of an endless belt of the conventional belt unit.

FIGS. 16A through 16C are sectional views of a part of the idle roller 6 in the vicinity of the guide roller 24 for illustrating the operation of the belt unit 3F of the seventh embodiment. The rotation axis X1 of the drive roller 5 is shown in FIGS. 16A through 16C, as well as the rotation axis X2 of the idle roller X2.

As shown in FIG. 16A, when the idle roller 6 does not rotate, the idle roller 6 is inclined so that the guide roller 24 side (i.e., the left side) of the idle roller 6 is lower than the other side (i.e., the right side) of the idle roller 6. In this state, when the drive roller 5 starts rotating (and the idle roller 6 is driven to rotate via the endless belt 4), the endless belt 4 starts skewing because of the inclination of the idle roller 6. The endless belt 4 urges the flange portion 24a of the guide roller 24 in the direction indicated by an arrow "+a" (i.e., the left in FIG. 16A). The force applied to the flange portion 24a of the guide roller 24 is detected by the detection sensor 25.

When the force detected by the detection sensor 25 exceeds a predetermined value, the motor 23 starts rotating the cam 22 so that the idle roller 6 swings in the direction indicated by an arrow "+b". As shown in FIG. 16B, when the guide roller 24 side of the idle roller 6 becomes higher than the other side, the endless belt 4 starts skewing as indicated by an arrow "-a", with the result that the force applied to the guide roller 24 decreases. When the force detected by the detection sensor 25 falls below a predetermined value, the motor 23 starts rotating the cam 22 in the reverse direction so that the idle roller 6 swings in the direction indicated by an arrow "-b" as shown in FIG. 16C. When the guide roller 24 side of the idle roller 6 becomes lower than the other side, the endless belt 4 starts skewing as indicated by an arrow "+a", with the result that the force applied to the guide roller 24 increases. By repeating the processes shown in FIGS. 16A through 16C, it becomes possible to restrict the skewing of the endless belt 4 to a small amount.

As described above, according to the seventh embodiment of the present invention, the detection sensor 25 detects the force caused by the skewing of the endless belt 4, and the direction of the rotation of the motor 23 is switched according to the detection (i.e., an output signal) of the detection sensor 25 so that the skewing of the endless belt 4 is corrected. Therefore, a large skewing of the endless belt 4 can be prevented. Particularly, because the skewing of the endless belt 4 is corrected according to the force caused by the skewing of the endless belt 4, it becomes possible to prevent meandering of the endless belt 4 and to enhance the accuracy of the movement of the endless belt 4. Moreover, the bead 15 and the pulley 9 (FIG. 4) described in the first embodiment can be eliminated, it becomes possible to reduce the cost of the belt unit.

In the above described embodiments, the belt unit has one idle roller 6. However, the belt unit may have a plurality of idle rollers. Furthermore, the mechanism for moving the endless belt 4 is not limited to the mechanism described in the above described embodiments. For example, it is possible to provide a gear or the like on the drive roller 5, and to provide another gear (engaging the gear of the drive roller 5) on the inner surface of the endless belt 4. In this case, the drive roller 5 can be disposed on an arbitrary position inside the endless belt 4.

The invention can be applicable to a belt unit using an endless belt such as a fixing belt unit and a conveyor belt unit for a recording medium, as well as the transfer belt unit used in the image forming apparatus.

While the preferred embodiments of the present invention have been illustrated in detail, it should be apparent that modifications and improvements may be made to the invention without departing from the spirit and scope of the invention as described in the following claims.

What is claimed is:

1. A belt unit attachable to and detachable from a main body, said belt unit comprising:
    a first roller rotated by a driving force of a driving source;
    a second roller having an axis substantially in parallel to an axis of said first roller;
    an endless belt stretched around said first and second rollers;
    a first supporting member that supports said first roller;
    a second supporting member that supports said second roller;
    a positioning member provided on said first supporting member for positioning said belt unit with respect to said main body;
    a rotational supporting mechanism that supports said second supporting member with respect to said first supporting member in such a manner that said second supporting member is rotatable relative to said first supporting member; and
    a parallelism maintaining mechanism comprising:
    a first shaft holding portion that holds shaft portions or bearing portions of said first roller; and
    a second shaft holding portion that holds shaft portions or bearing portions of said second roller, said second shaft holding portion being fixed to said first shaft holding portion.

2. The belt unit according to claim 1, wherein said rotational supporting mechanism has a rotation axis substantially aligned with a center position of said first roller in the axial direction, and said rotation axis is substantially perpendicular to the axial direction of said first roller.

3. The belt unit according to claim 1, wherein said rotational supporting mechanism comprises:
    a projection that projects from said first supporting member toward said second supporting member, said projection being substantially aligned with a center position of said first roller in the axial direction; and
    an engaging hole formed on said second supporting member, said engaging hole engaging said projection.

4. The belt unit according to claim 1, further comprising at least one additional roller being disposed between said first and said second rollers, said additional roller being supported by said first supporting member so that said additional roller is parallel to said first and second rollers.

5. The belt unit according to claim 1, wherein said parallelism maintaining mechanism regulates positions of axial ends of said first roller and positions of axial ends of said second roller to thereby hold said first and second rollers substantially in parallel to each other.

6. The belt unit according to claim 1, wherein said parallelism maintaining mechanism is integrally formed with said second supporting member and disposed outside said first supporting member and inside said endless belt.

7. The belt unit according to claim 1, further comprising:
    a contact member provided in the vicinity of said second roller in such a manner that said contact member is able to contact an end of said endless belt in the width direction;
    a detection unit that detects a force applied by said endless belt to said contact member; and
    an inclination adjusting mechanism that changes the inclination of said second roller so as to reduce the force detected by said detection unit.

8. The belt unit according to claim 1, further comprising a regulating mechanism that regulates the position of said endless belt in the axial direction of said second roller.

9. The belt unit according to claim 8, wherein said regulating mechanism comprises:
    a regulating member provided on an inner surface of said endless belt; and
    an engaging member provided on an end of said second roller in the axial direction, said engaging member having a groove that engages said regulating member.

10. The belt unit according to claim 8, wherein said regulation mechanism comprises a flange member provided on an end of said second roller in the axial direction in such a manner that said flange portion is able to contact an end of said endless belt in the width direction.

11. An image forming apparatus including a belt unit attachable to and detachable from a main body, said belt unit comprising:
    a first roller rotated by a driving force of a driving source;
    a second roller having an axis substantially in parallel to an axis of said first roller;
    an endless belt stretched around said first and second rollers;
    a first supporting member that supports said first roller;
    a second supporting member that supports said second roller;
    a positioning member provided on said first supporting member for positioning said belt unit with respect to said main body;
    a rotational supporting mechanism that supports said second supporting member with respect to said first supporting member in such a manner that said second supporting member is rotatable relative to said first supporting member; and
    a parallelism maintaining mechanism comprising:
    a first shaft holding portion that holds shaft portions or bearing portions of said first roller; and
    a second shaft holding portion that holds shaft portions or bearing portions of said second roller, said second shaft holding portion being fixed to said first shaft holding portion.

* * * * *